United States Patent [19]

Reitler

[11] 3,765,118
[45] Oct. 16, 1973

[54] DOWNRIGGER RELEASE FOR DEEP WATER TROLLING

[76] Inventor: Richard C. Reitler, Rt. One, Delton, Mich. 49046

[22] Filed: June 23, 1972

[21] Appl. No.: 265,730

[52] U.S. Cl. .............................. 43/43.12, 24/126 L
[51] Int. Cl. ............................................. A01k 97/00
[58] Field of Search ................. 43/43.12; 24/115 F, 24/126 L, 136 L, 201 TR

[56] References Cited
UNITED STATES PATENTS

| | | | |
|---|---|---|---|
| 2,749,649 | 6/1956 | Fitzsimmons | 43/43.12 |
| 2,858,637 | 11/1958 | Stark | 43/43.12 |
| 3,023,535 | 3/1962 | Holka et al. | 43/43.1 |
| 3,659,370 | 5/1972 | Ritter | 43/43.12 |

Primary Examiner—Louis G. Mancene
Assistant Examiner—Daniel J. Leach
Attorney—Gordon W. Hueschen et al.

[57] ABSTRACT

A downrigger release for deep water trolling which comprises a hollow, tubular member closed at one end and open at the other end. An elongated, tapered, frusto-conical member is received within said hollow, tubular member and retains a fishing line between the inner wall of the hollow, tubular member and the lateral surface of the frusto-conical member.

3 Claims, 2 Drawing Figures

PATENTED OCT 16 1973

3,765,118

DOWNRIGGER RELEASE FOR DEEP WATER TROLLING

BACKGROUND OF THE INVENTION

This invention relates to fishing equipment. More particularly, this invention relates to equipment for deep water trolling.

When fishing for coho salmon, lake trout, or the like, usually a so-called downrigger is utilized. The downrigger comprises a reel mounted on a side or the stern of a boat and a long weighted line or cable. One or more fishing lines are attached to the downrigger line so that the baited hook thereof will be retained at a predetermined depth during trolling. The fishing line or lines are removably attached to the downrigger line so that the fishing line will be released from the downrigger line upon a fish striking the bait. The heretofore known downrigger releases are of such design that one portion of the release is affixed to the downrigger line and another portion thereof is affixed to the fishing line. Such an arrangement creates a problem because the release portion affixed to the fishing line prevents the complete reeling in of the fishing line when landing a fish because the release portion attached to the fishing line will not pass through the line guides of the fishing rod.

It is an object of the present invention to obviate the foregoing shortcomings of downrigger releases and to provide a release which does not hinder the reeling in of a fishing line.

Still other objects will readily present themselves to the skilled artisan upon reference to the ensuing specification, the drawing, and the claims.

SUMMARY OF THE INVENTION

The present invention contemplates a downrigger release for deep water trolling which comprises a hollow, tubular member having an open end and a closed end; an affixation means at the closed end of said hollow, tubular member for securing the hollow, tubular member to a downrigger line; an elongated, tapered, frusto-conical member received in said hollow, tubular member; and an eyelet means at the relatively larger end of said frusto-conical member for passing a fishing line therethrough.

The relatively smaller end of the frusto-conical member is substantially smaller than the inside diameter of the hollow, tubular member and is provided with a groove transversely thereacross for receiving the fishing line. The midsection of the frusto-conical member is of a diameter smaller than the inside diameter of the hollow, tubular member by at least two times the outside diameter of the fishing line. The relatively larger end of the frusto-conical member is of a diameter at least equal to the inside diameter of the hollow, tubular member.

DESCRIPTION OF THE PREFERRED EMBODIMENTS

Figure 1:
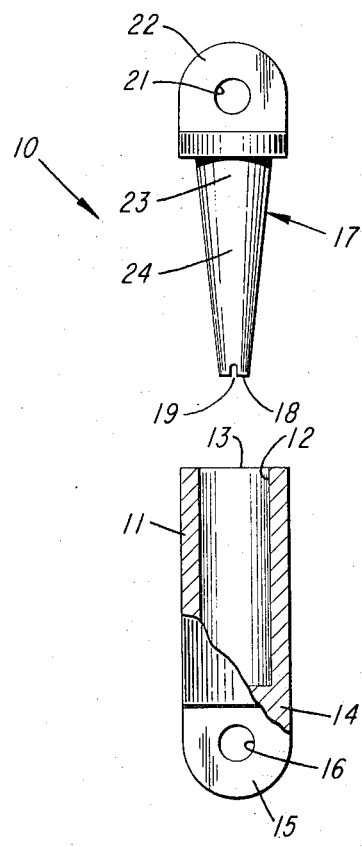
FIG. 1 is an exploded view of the downrigger release of this invention with a portion of the hollow, tubular member thereof broken away to show interior detail.

Referring to FIG. 1, downrigger release 10 comprises hollow, tubular member 11 and elongated, tapered, frusto-conical member 17. Hollow, tubular member 11 is provided with substantially uniform bore 12, open end 13 and closed end 14. Eyelet means 15 at closed end 14 is provided with opening 16 by means of which downrigger release 10 can be affixed to a downrigger line. Other affixation means for securing downrigger release 10 to a downrigger line can be utilized as well.

Figure 2:
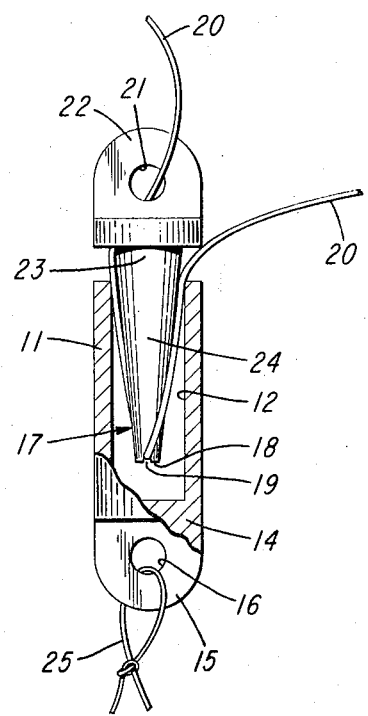
FIG. 2 is an assembled view of the release of this invention with a portion of the hollow, tubular member broken away to show interior detail.

Relatively smaller end 18 of frusto-conical member 17 is substantially smaller than the inside diameter of bore 12 as can be seen in FIG. 2. Groove 19 in end 18 extends transversely across and receives fishing line 20 which is also threaded through opening 21 in eyelet 22 at relatively larger end 23 of frusto-conical member 17. End 23 is fabricated having an outside diameter at least equal to the inside diameter of bore 12 in hollow, tubular member 11. Midsection 24 of member 17 is fabricated having an outside diameter smaller than the inside diameter of bore 12 by at least two times the outside diameter of fishing line 20. In this manner a friction fit can be achieved when downrigger release 10 is assembled so as to attach fishing line 20 to downrigger line 25 which is secured to hollow, tubular member 11 through opening 16 in eyelet 15.

The present mode of fishing line attachment has been found sufficient to attach fishing line 20 to downrigger line 25 so that the bait is kept at a desired predetermined depth. Yet, when a fish takes the bait, the strike is adequate to pull out frusto-conical member 17, lodged in bore 12, with the aid of fishing line 20. However, by virtue of the present arrangement frusto-conical member 17 is not lost but slides freely on line 20 when released, thereby also enabling fishing line 20 to be completely reeled in when the fish is landed.

The downrigger release of the present invention can be fabricated by machining, molding, or the like, from a wide variety of materials. Particularly suitable material of construction is a polyamide resin such as nylon; however, other plastic materials such as polyethylene, polypropylene, and the like, can be utilized as well for the present purposes.

The foregoing description and the drawing are intended as illustrative and are not to be taken as limiting. Still other variations and rearrangements of parts are possible and will readily present themselves to one skilled in the art.

I claim:

1. Downrigger release for deep water trolling which comprises
    a hollow, tubular member having an open end and a closed end;
    an affixation means at the closed end of said hollow, tubular member for securing said hollow, tubular member to a downrigger line;
    an elongated, tapered, frusto-conical member received in said hollow, tubular member; and
    an eyelet means at the relatively larger end of said frusto-conical member provided with an opening for passing a fishing line therethrough;
    the relatively smaller end of said frusto-conical member being substantially smaller than the inside diameter of said hollow, tubular member and being provided with a groove for receiving said fishing line transversely across the smaller end;

the midsection of said frusto-conical member being of a diameter smaller than the inside diameter of said hollow, tubular member by at least two times the outside diameter of said fishing line; and the relatively larger end of said frusto-conical member being of a diameter at least equal to the inside diameter of said hollow, tubular member.

2. The downrigger release for deep water trolling in accordance with claim 1 wherein the hollow, tubular member and the elongated, tapered, frusto-conical member are both made of a polyamide resin.

3. The downrigger release for deep water trolling in accordance with claim 1 wherein the affixation means is an eyelet at the closed end of said hollow, tubular member and provided with an opening sufficiently large to receive the downrigger line therethrough.

* * * * *